(12) United States Patent
Jung et al.

(10) Patent No.: US 10,636,427 B2
(45) Date of Patent: Apr. 28, 2020

(54) USE OF VOICE RECOGNITION TO GENERATE A TRANSCRIPT OF CONVERSATION(S)

(71) Applicant: Microsoft Technology Licensing, LLC, Redmond, WA (US)

(72) Inventors: Christopher Andrews Jung, Seattle, WA (US); Benjamin David Smith, Renton, WA (US); Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/015,761

(22) Filed: Jun. 22, 2018

(65) Prior Publication Data
US 2019/0392837 A1    Dec. 26, 2019

(51) Int. Cl.
G10L 15/26 (2006.01)
G06F 3/16 (2006.01)
G10L 15/22 (2006.01)
G10L 17/00 (2013.01)

(52) U.S. Cl.
CPC ............ G10L 15/265 (2013.01); G06F 3/167 (2013.01); G10L 15/22 (2013.01); G10L 17/005 (2013.01)

(58) Field of Classification Search
CPC ..... G10L 15/265; G10L 15/22; G10L 17/005; G06F 3/167
See application file for complete search history.

(56) References Cited

U.S. PATENT DOCUMENTS

| 2010/0305945 A1* | 12/2010 | Krishnaswamy ....... G10L 15/26 704/235 |
| 2011/0112833 A1* | 5/2011 | Frankel .................. G10L 15/32 704/235 |
| 2013/0022189 A1 | 1/2013 | Ganong et al. |
| 2013/0144603 A1 | 6/2013 | Lord et al. |
| 2015/0106091 A1 | 4/2015 | Wetjen et al. |
| 2017/0263265 A1 | 9/2017 | Ashikawa et al. |

OTHER PUBLICATIONS

"Style Guide—Transcribe.com", https://web.archive.org/web/20170421144808/https://www.transcribe.com/transcription-jobs-online/style-guide/, Apr. 21, 2017. 4 pages (Year: 2017).*

(Continued)

*Primary Examiner* — Nafiz E Hoque
(74) *Attorney, Agent, or Firm* — Newport IP, LLC; Jacob P. Rohwer

(57) ABSTRACT

Examples described herein improve the way in which a transcript is generated and displayed so that the context of a conversation taking place during a meeting or another type of collaboration event can be understood by a person that reviews the transcript (e.g., reads or browses through the transcript). The techniques described herein use voice recognition to identify a user that is speaking during the meeting. Accordingly, when the speech of the user is converted to text for the transcript, the text can be attributed to the identified user. The techniques described herein further configure a graphical user interface layout, in which the transcript can be displayed. The graphical user interface layout enables users to better understand the context of a conversation that takes place during a meeting.

17 Claims, 12 Drawing Sheets

(56) References Cited

OTHER PUBLICATIONS

"Style Guide—Transcribe.com", Retrieved From: https://web.archive.org/web/20170421144808/https://www.transcribe.com/transcription-jobs-online/style-guide/, Apr. 21, 2017, 4 Pages.

"International Search Report and Written Opinion Issued in PCT Application No. PCT/US2019/036212", dated Aug. 29, 2019, 15 Pages.

* cited by examiner

Sales Meeting Transcript 202

Sequence of Text Segments 138

- Lisa R.: Our team did not meet the sales goal for this quarter, although we were close. I believe there are some valid reasons for this, and I understand that each of you may have some additional feedback as to why we fell short. — Text Segment 204
- Joe S.: Adapting to the new procedures has been a frustrating process that affected my total sales. — Text Segment 206
- Beth T.: Losing two team members in the middle of the quarter hurt us. — Text Segment 208
- Lisa R.: I know we encountered some unexpected obstacles, but I still think we can identify some key points that will help us improve sales. — Text Segment 210
- Tim G.: We need to focus on upselling existing customers rather than put so much effort into attracting new customers. — Text Segment 212
- Joe S.: Existing customers know our products and are familiar with our great service. — Text Segment 214

Transcript Viewing Application 136

Sidebar 1102
- Jane W.: Sure — Short Utterance 1104
- Tim G.: Agreed — Short Utterance 1106
- Beth T.: Ok — Short Utterance 1108

1100

USE OF VOICE RECOGNITION TO GENERATE A TRANSCRIPT OF CONVERSATION(S)

BACKGROUND

Transcription services convert human speech into corresponding text, so a person can review what was said during a broadcast or a presentation, for example. However, conventional transcription services typically produce deficient results when multiple people are engaged in a conversation because the produced transcript typically includes a single flow text based solely on a time at which word(s) are spoken. A conversation typically captures a collaboration between multiple people, and thus, the person currently speaking often switches over time, one person may interrupt another person, and/or two or more users may speak during a same or an overlapping period of time. The single flow text makes it difficult for a person reviewing the transcript to understand the context of the conversation. For instance, a person reviewing the transcript is often unable to effectively identify a person that spoke a particular group of words. Moreover, the single flow text often mixes the words spoken by different people in a disjointed manner thereby making it difficult to follow the conversation between multiple people.

SUMMARY

The techniques disclosed herein improve the way in which a transcript is generated and displayed so that the context of a conversation taking place during a meeting or another type of collaboration event can be understood by a person that reviews the transcript (e.g., reads or browses through the transcript). The techniques described herein use voice recognition to identify a user that is speaking during the meeting. Accordingly, when the speech of the user is converted to text for the transcript, the text can be attributed to the identified user. The techniques described herein further configure a graphical user interface layout, in which the transcript can be displayed. The graphical user interface layout enables users to better understand the context of a conversation that takes place during a meeting. In various examples, some of the users attending the meeting and/or participating in the conversation are co-located in a physical environment (e.g., a conference room) in which the meeting is taking place or being hosted. Users may alternatively attend the meeting and/or participate in the conversation from a remote location using a collaboration application that operates using a network connection.

The system described herein is configured to capture utterances spoken by different users attending a meeting. For instance, a device operating in a physical environment in which the meeting is taking place can detect and capture utterances as the users converse about a topic. In a specific example, the device can be assigned to and configured within a conference room (e.g., a network-connected device can be mounted on a conference room table). Alternatively, the device can be a personal device of a user that attends the meeting (e.g., a user sitting in the conference room or a user attending the meeting from a remote location using a network connection). An utterance can comprise a continuous set of words (e.g., a statement, a comment, a phrase, a sentence, etc.) spoken by a single user attending the meeting. An utterance may be considered continuous in that (i) the words are spoken by the user within a pre-defined period of time (e.g., five seconds, ten seconds, twenty seconds, etc.) and/or (ii) the words spoken by the user are not interrupted by words spoken by other users attending the meeting.

For an individual utterance spoken, the techniques match a voice with a voice recognition profile that identifies an individual user. The techniques further use speech-to-text conversion to generate a transcript for the meeting. The transcript includes a sequence of text segments where an individual text segment includes an utterance spoken by a single user. The transcript can then be displayed in a graphical user interface layout that clearly defines the text segments and a graphical association between a text segment and the user that spoke the corresponding utterance that has been converted to text.

In contrast to the way in which the conventional transcription services use a single flow text that transcribes what was spoken during a meeting based solely on a time in which the corresponding words were spoken, the techniques described herein are configured to intelligently create and lay out the text segments in a graphical user interface that displays the transcript. In one example, the techniques combine a first set of words and a second set of words (e.g., a set can include one or more words), that are part of an utterance spoken by a user, into a single text segment. The techniques distinguish between the first set of words and the second set of words due to a detected interruption (e.g., the first set of words and the second set of words are separated by an interruption). For instance, the interruption can include a set of words spoken by another user. In one example, the interruption can be associated with an interjection of words that causes the user to pause for a short period of time (e.g., a few seconds) after the first set of words are spoken and before speaking the second set of words. The user may pause to listen to the words being spoken by the other user. In another example, the interruption can be associated with the other user beginning to speak his or her words at the same time the user is speaking the second set of words. Stated another way, the other user begins speaking before the user finishes speaking thereby resulting in an overlapping time period in which multiple people are speaking.

Consequently, the techniques described herein are configured to combine the first and second sets of words spoken by a single user into a single text segment even though there are intervening or overlapping words spoken by the other user. To this end, the first and second sets of words comprise an utterance spoken by the user and the single text segment can be placed in the sequence of text segments of the transcript before a subsequent text segment that captures the set of words spoken by the other user.

In various implementations, the combination of the first and second sets of words can be based on a determination that a number of words in the first set of words does not meet or exceed a predefined minimum threshold number of words established for a text segment. In alternative implementations, the combination of the first and second sets of words can be based on a determination that the first set of words and the second set of words are part of a same linguistic unit (e.g., a phrase, a clause, a sentence, or another type of linguistic unit that is capable of standing alone from a grammar perspective).

The voice recognition techniques and/or the speech-to-text conversion techniques can be provided and/or implemented by network resources (e.g., a system of devices operated by service or network providers). Alternatively, voice recognition techniques and/or the speech-to-text conversion techniques can be provided and/or implemented locally by a device configured in an environment where the meeting and conversations are taking place (e.g., a video-conferencing device, a smartphone, a tablet device, a laptop device, a conference room hub device, an Internet-of-things device, etc.).

In various examples, the system can implement filtering functionality that enables a user to search the transcript for discussions involving a keyword or for speech by a specific user, or a combination of the two. For instance, the graphical user interface can display a control element that enables the transcript to be filtered based on a user identifier and/or a keyword. The control element can include a text entry window where a user can enter a keyword or a name of a user. The control element may also or alternatively include pre-configured user identifiers (e.g., user names, user avatars, user photos, etc.) that can easily be selected (e.g., clicked on) so the transcript can be filtered. Consequently, the control element is configured to receive user input that specifies the user identifier and/or the keyword, and based on the user input, the system searches the transcript to identify text segments that include the user identifier, and/or the keyword specified by the user input. The transcript is then filtered so that the identified text segments are displayed. That is, text segments not spoken by a user being searched for and/or text segments that do not include discussion that involve the keyword being searched for are removed from the transcript. In some implementations, a preset number (e.g., one, two, etc.) of one or more text segments that immediately precede an identified text segment and/or a preset number one or more text segments and one or more text segments that immediately follow the identified text segment may also be displayed in the filtered transcript, so a reader can effectively determine the context in which an utterance was spoken.

In various examples, meeting information can be used to identify users expected to attend the meeting and to access and prepare voice recognition profiles for use in advance of the meeting or at the outset of the meeting. In one example, the meeting information includes a calendar appointment object that lists invitees to the meeting. Accordingly, the system can automatically retrieve and/or load voice recognition profiles for a list of users expected to attend the meeting, so they can seamlessly be used to recognize voices and generate the transcript, as described above. In some implementations, the voice recognition profiles can be retrieved from an external resource that is configured to build and store a voice recognition profile (e.g., a social or enterprise network account, a dictation service account, etc.). Retrieval of a voice recognition profile from an external resource may depend on user-specified access permissions between an application implementing the techniques described herein and the external resource.

In further examples, the system can determine that a voice recognition profile is inaccessible for a user that is attending the meeting or that is expected to attend the meeting (e.g., a guest and/or an unexpected attendee). Without a voice recognition profile, the system may be unable to recognize the voice of the user and associate a user identifier with what the user says during the meeting. In this scenario, the system can be configured to prompt an unrecognizable user for an identity and/or ask an unrecognizable user to say some words, so a voice recognition profile can be built in association with the revealed identity. In one example, the system can detect that an unrecognizable voice is speaking, and thus, the system can interrupt the speaker and ask for an identity and/or further speech so that a voice recognition profile can be built. That is, a computer-implemented agent of the system may verbally output: "Excuse me; I am unable to recognize the voice of the current speaker. Can the current speaker please identify herself or himself, so I can associate a user identifier with what you say in the transcript being generated for this meeting?" In another example, the system can be configured to determine that a voice recognition profile is not available for a user on an a meeting invite list and subsequently ask the user to say some words during an introduction time period of the meeting (e.g., during the first minute of the meeting). That is, the computer-implemented agent of the system may verbally output: "A transcript is being generated for this meeting and I am unable to recognize the voice of Joe S., who is listed as an attendee. Joe S. please say some words, so I can obtain information useable to recognize your voice." More specifically, the computer-implemented agent may ask the unrecognizable user to recite a predefined statement that is helpful with respect to building a voice model for a voice recognition profile.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 illustrates an example graphical user interface that displays a re-positioned text segment in the sequence of text segments based on an association between an utterance and a previously discussed topic during the meeting.

FIG. 11 illustrates an example graphical user interface that displays short utterances in a display area that is separate from a display area that displays the sequence of text segments of the transcript.

DETAILED DESCRIPTION

Examples described herein improve the way in which a transcript is generated and displayed so that the context of a conversation taking place during a meeting or another type of collaboration event can be understood by a person that reviews the transcript. The described techniques use voice recognition to identify a user that is speaking during the meeting. Accordingly, when the speech of the user is converted to text for the transcript, the text can be attributed to the identified user. The described techniques further configure a graphical user interface layout, in which the transcript can be displayed. The graphical user interface layout enables users to better understand the context of a conversation that takes place during a meeting.

In contrast to the way in which the conventional transcription services use a single flow text that transcribes what was spoken during a meeting based solely on a time in which the corresponding words were spoken and/or detected, the techniques described herein are configured to intelligently create and lay out the text segments in a sequence. In one example, the techniques combine a first set of words and a second set of words that are part of an utterance spoken by a user, into a single text segment. The first set of words and the second set of words can be separated by an interruption. For instance, another user may begin to speak before the user is able to finish saying what he or she wants to say thereby resulting in an overlapping time period in which multiple people are talking.

In various implementations, the combination of the first and second sets of words can be based on a determination that a number of words in the first set of words does not meet or exceed a predefined minimum threshold number of words established for a text segment. In alternative implementations, the combination of the first and second sets of words can be based on a determination that the first set of words and the second set of words are part of a same linguistic unit designated as a basis for a text segment (e.g., a phrase, a clause, a sentence, or another type of linguistic unit that is capable of standing alone from a grammar perspective).

Various examples, scenarios, and aspects are described below with reference to FIGS. 1-11.

Figure 1:
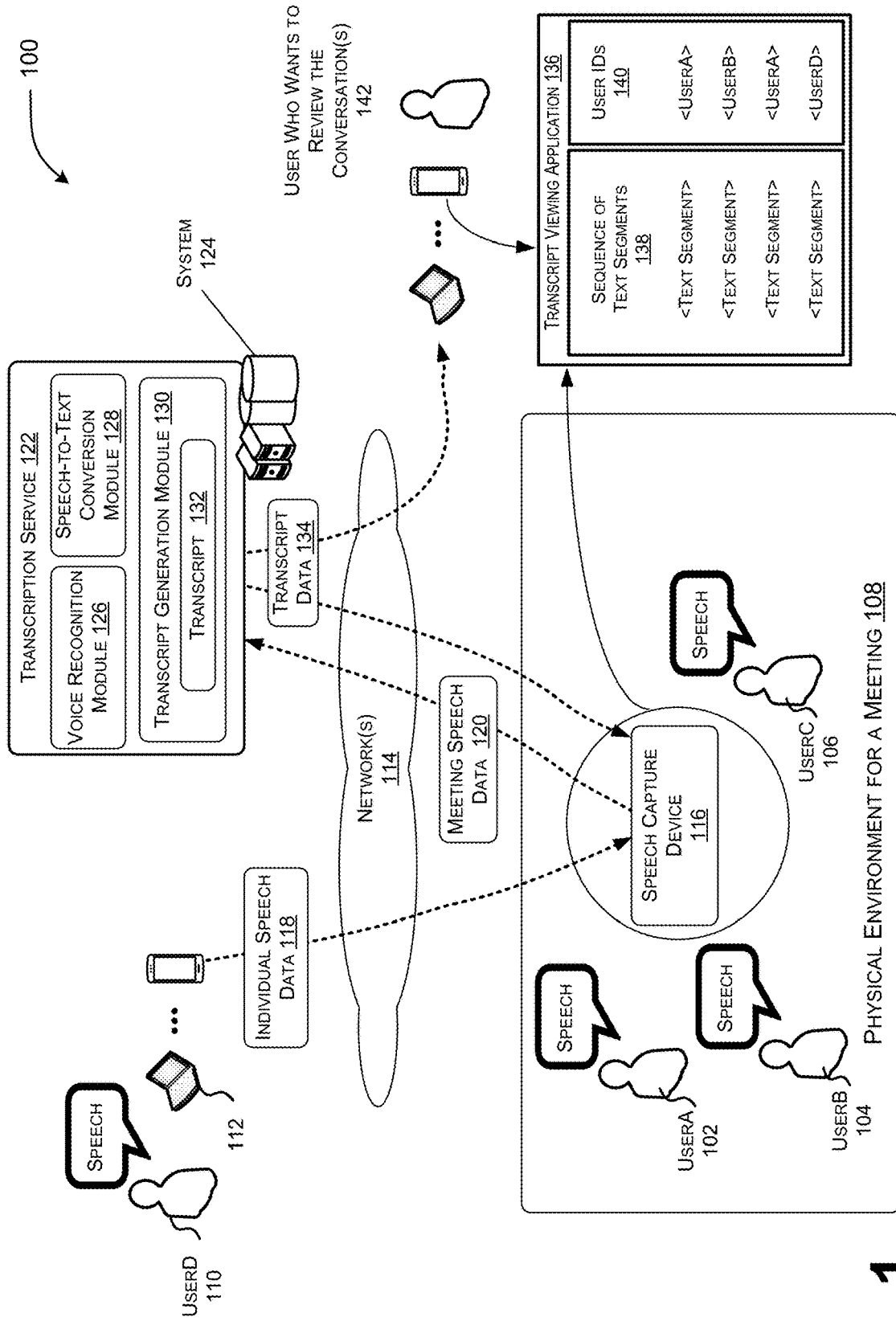
FIG. 1 is a diagram illustrating an example environment in which a conversation between multiple users attending a meeting or another collaborative setting can be captured and transcribed in an organized manner so that a person reviewing the transcript can better follow the conversation.

FIG. 1 is a diagram illustrating an example environment 100 in which a conversation between multiple users attending a meeting or another collaborative setting can be captured and transcribed in an organized manner so that a person reviewing the transcript can better follow the conversation. FIG. 1 illustrates multiple users attending a meeting and/or participating in conversations. As shown, a first user 102 ("UserA"), a second user 104 ("UserB"), and a third user 106 ("UserC") are co-located in a physical environment 108 in which the meeting is being held, such as a conference room. Furthermore, a fourth user 110 ("UserD") is attending the meeting and/or participating in the conversations from a remote location using a device 112 (e.g., a smartphone device, a laptop device, a videoconferencing device, etc.) and a connection over network(s) 114.

When multiple different users engage in conversation about a topic while co-located in the same physical environment 108, they are in a better position to pick up on each other's non-verbal cues (e.g., eye contact, hand movement, body movement, head movement, etc.). Accordingly, the conversation has a natural tendency at times to become choppy in the sense that (i) there are frequent switches in current speakers, (ii) users interrupt each other, and/or (iii) multiple users may speak at the same time. Consequently, the techniques described herein can be implemented, at least in part, by a speech capture device 116 operating within the physical environment 108 in which multiple users are co-located. However, attendees to the meeting may also join and participate from a remote location, as shown.

For ease of discussion, FIG. 1 illustrates four users participating in the meeting. However, the techniques described herein can be implemented with regard to any number of multiple users attending a meeting and participating in conversations (e.g., two, three, five, ten, twenty, etc.).

The speech capture device 116 is configured to use a microphone or other speech input component to detect and capture utterances, as represented by the "speech" elements in FIG. 1, as the users (e.g., UserA 102, UserB 104, UserC 106) converse about a topic. The speech capture device 116 may also be configured to detect and capture utterances of UserD 110 based on the network communication and audio output of UserD's 110 individual speech data 118 via network(s) 114. As described above, the speech capture device 116 can be assigned to and configured within the physical environment 108 (e.g., a dedicated conference room device). Alternatively, the speech capture device 116 can be a personal device of a user (e.g., UserA 102) that attends the meeting. An utterance can comprise a continuous set of words spoken by a single user attending the meeting. An utterance may be considered continuous in that (i) the words are spoken by the user within a pre-defined period of time (e.g., five seconds, ten seconds, twenty seconds, etc.) and/or (ii) the words spoken by the user are not interrupted by words spoken by other users attending the meeting.

The speech capture device 116 is configured to transmit the utterances spoken by multiple users (e.g., collectively illustrated as the meeting speech data 120) to a transcription service 122 over network(s) 114. The transcription service 122 is operated by a network-based system 124 of one or more devices. To this end, the transcription service 122 includes a voice recognition module 126, a speech-to-text conversion module 128, and a transcript generation module 130. While each of the voice recognition module 126, the speech-to-text conversion module 128, and the transcript generation module 130 is shown to implement functionality via the network-based system 124, it is understood in the context of this disclosure that the functionality implemented by one or more of the voice recognition module 126, the speech-to-text conversion module 128, and the transcript generation module 130 can alternatively be implemented by the speech capture device 116, or a combination of the network-based system and the speech capture device 116.

The voice recognition module 126 is configured to receive the meeting speech data 120 from the image capture device 116 and to recognize a voice that speaks an utterance. Thus, the voice recognition module 126 matches a voice with a voice recognition profile to identify a user that spoke. A voice recognition profile can be built or trained for an individual user as the user speaks (e.g., during the meeting or other times before the meeting such as in previous meetings). Consequently, the voice recognition module 126 is configured to analyze a specific voice of a user and tune the recognition of the user's speech based on the analysis to increase voice recognition accuracy. In FIG. 1, the voice recognition module 126 is configured to recognize the different voices of each of UserA 102, UserB 104, UserC 106, and UserD 110.

The speech-to-text conversion module 128 is configured to receive the meeting speech data 120 from the image capture device 116 and to convert the meeting speech data 120 into text data. The speech-to-text conversion module 128 can also receive user identifiers from the voice recognition module 126 so a portion of the text data (e.g., an utterance) can be attributed to the specific user that spoke the utterance. Once converted, the speech-to-text conversion module 128 provides the text data and corresponding user identifiers to the transcript generation module 130 so that a transcript 132 for the meeting can be generated and subsequently displayed.

The transcript generation module 130 is configured to divide the text data into text segments that can be laid out in an organized manner so that a reader of the transcript can better follow the conversation. An individual text segment includes an utterance spoken by a single user. The transcript generation module 130 can transmit transcript data 134 so that it can be displayed via a graphical user interface of a transcript viewing application 136. In various examples, the graphical user interface includes a first area 138 that displays a sequence of text segments and a second area 140 that displays the user identifiers. The information presented in the first area 138 and the second area 140 can be configured so that there is a graphical association between an individual text segment and a single user to which the text segment is attributed (e.g., a user that spoke the utterance). As shown via the second area 140 of the graphical user interface, the identifier <UserA> is graphically level with the first <text segment> listed in the first area 138 and thus a viewer of the transcript can deduce that UserA spoke the first text segment listed in the first area 138, <UserB> is graphically level with the second <text segment> listed in the first area 138 and thus the viewer can deduce that UserB spoke the second text segment listed, <UserC> is graphically level with the third <text segment> listed in the first area 138 and thus the viewer can deduce that UserC spoke the third text segment listed, <UserD> is level with the fourth <text segment> listed in the first area 138 and thus the viewer can deduce that UserD spoke the fourth text segment listed, and so forth.

While the graphical user interface shows two display areas, it is understood in the context of this disclosure that a demarcation between the information presented in the two display areas is not required. Rather, other graphical association or connections between a text segment and a user identifier are contemplated. For example, a user identifier such as a name or a user avatar can be presented on top of a text segment or on the left side of a text segment to graphically attribute the spoken words to a specific user. In another example, a color of text or a highlight color can be used to attribute text segments to a specific user (e.g., blue is for UserA, red is for UserB, etc.).

The transcript 132 can be displayed by the transcript generation module 130 in real-time to the attendees of the meeting. For example, a display device associated with the speech capture device 116 can display the transcript so the attendees can visually follow the conversation as the conversation develops. Alternatively, the transcript 132 can be displayed by the transcript generation module 130 after the meeting is over. For example, upon request, the transcript generation module 130 can cause the transcript 132 to be displayed for a user 142 who wants to review what was said during the meeting. The user can be an attendee to the meeting or someone who may have missed the meeting for various reasons.

In some implementations, the device 112 used by UserD 110 to remotely attend the meeting can also detect and capture utterances spoken by UserD 110 and send the individual speech data 118 directly to the transcription service 122 using network(s) 114.

In alternative scenarios to those illustrated in FIG. 1, the techniques described herein can be implemented in association with a virtual meeting in which none of the attendees are co-located in the same physical environment. Accordingly, separate devices (e.g., smartphone devices, laptop devices, videoconferencing devices, etc.) employed by the users to attend the virtual meeting and to participate in conversations can capture utterances and send individual speech data to the transcription service 122.

Figure 2:
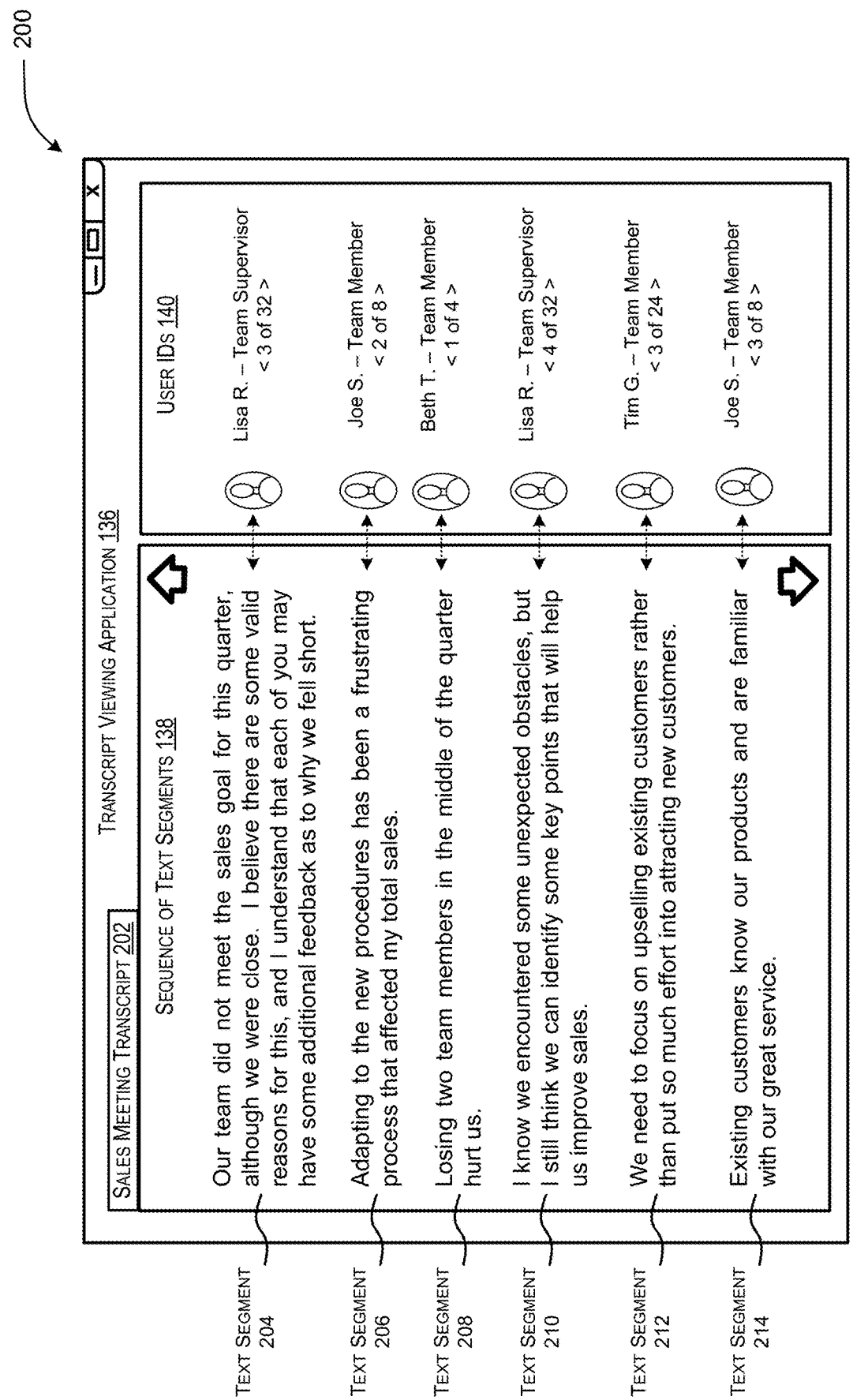
FIG. 2 illustrates an example graphical user interface in which a transcript is laid out in an organized and improved manner, so that a user can effectively follow the conversation and determine which utterances are attributed to different users.

FIG. 2 illustrates an example graphical user interface 200 in which a transcript is laid out in an organized and improved manner, so that a user can effectively follow the conversation and determine which utterances are attributed to different users. The graphical user interface 200 displays text segments that are part of a conversation that occurs during a sales meeting, and thus, the transcript viewing application 136 has labeled the transcript as a sales meeting transcript 202. The first listed (or currently displayed) text segment 204 includes an utterance attributed to Lisa R., who is the team supervisor. The second listed text segment 206 includes an utterance attributed to Joe S., who is a team member. The third listed text segment 208 includes an utterance attributed to Beth T., who is also a team member. The fourth listed text segment 210 includes another utterance attributed to Lisa R. The fifth listed text segment 212 includes an utterance attributed to Tim G., who is also a team member. And the sixth listed text segment 214 includes another utterance attributed to Joe S.

As shown, the graphical user interface 200 provides separation between individual text segments so that a viewer can better associate the text segment with a user that spoke the words. Furthermore, the user identifiers can include one or more graphical elements useable to enable the viewer to identify a user and/or gather information about the user. A graphical element can include a user name, a user alias, a user avatar, a user photo, a title, a user location, and so forth. Consequently, as the viewer browses or scrolls through (e.g., by selecting one of the arrows or using a scroll bar or some other scrolling functionality) the sequence of text segments that comprise the sales meeting transcript 202, the viewer can effectively associate a text segment with a user that spoke the utterance reflected via the text segment. As the user scrolls through the sequence of text segments, the user identifiers will also scroll to maintain the graphical association between a user identifier and a text segment.

In various examples, a transcript can be configured to number text segments for an individual user to reveal an ordering and a total number of times the individual user spoke during the meeting. For example, text segment 204 is the third utterance spoken by Lisa R. out of thirty-two total utterances spoken during the meeting. Since Lisa R. is the team supervisor, she may be the host and main speaker of the meeting. Text segment 210 is the fourth utterance spoken by Lisa R. out of thirty-two total utterances spoken during the meeting. Moving on, text segment 206 is the second utterance spoken by Joe S. out of eight total utterances spoken during the meeting, and text segment 214 is the third utterance spoken by Joe S. out of eight total utterances spoken during the meeting. Text segment 208 is the first utterance spoken by Beth T. out of four total utterances spoken during the meeting.

The ordering and a total number of times the individual user spoke during the meeting can provide an indication of a level of activity to a viewer. That is, while scrolling through the transcript, the viewer can see which users were more active than others with respect to speaking during the entire meeting and/or with respect to a topic of conversation within the meeting.

Figure 3:
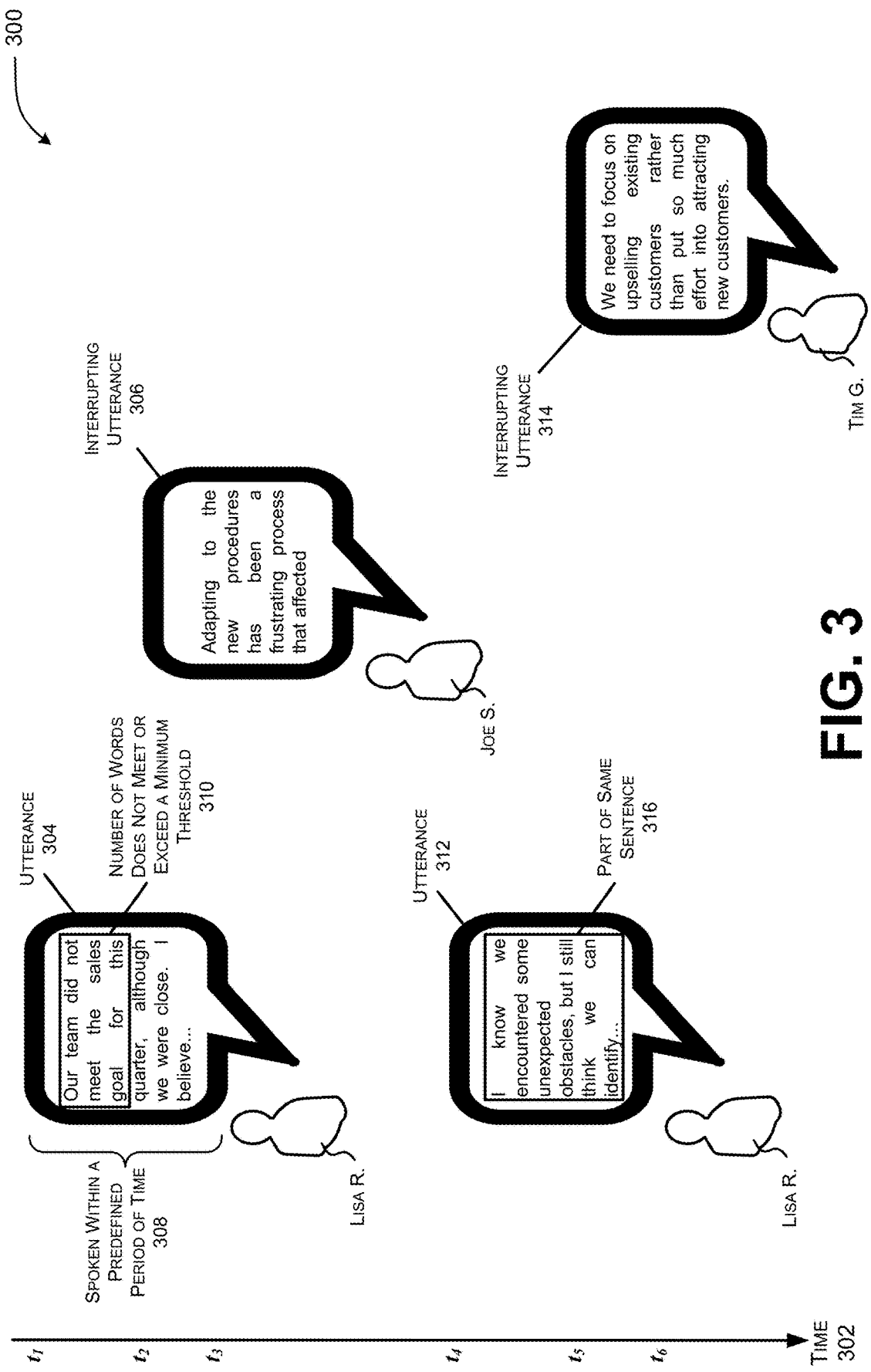
FIG. 3 illustrates a diagram that captures how text segments are created when an utterance being spoken by one user is interrupted by an utterance spoken by another user.

FIG. 3 illustrates a diagram 300 that captures how text segments are created when an utterance being spoken by one user is interrupted by an utterance spoken by another user. As described above, an interruption occurs when a first user is currently speaking, and a second user also begins to speak. In one example, the interruption can be associated with an interjection of words that causes the first user to pause for a short period of time (e.g., a few seconds) before continuing to speak. The first user may pause to listen to the words being spoken by the second user. In another example, the interruption can be associated with the second user beginning to speak his or her words at the same time the first user continues to say words. Stated another way, the second user begins speaking before the first user finishes speaking thereby resulting in an overlapping time period in which multiple people are speaking.

The diagram 300 of FIG. 3 lays out some of the utterances in FIG. 2 with respect to a time 302 at which the utterances are spoken (e.g., during the meeting and/or in the course of conversation). As shown, at a time $t_1$ during the meeting, Lisa R. begins speaking utterance 304 which includes the words: "Our team did not meet the sales goal for this quarter, although we were close. I believe there are some valid reasons for this, and I understand that each of you may have some additional feedback as to why we fell short." Before Lisa R. is able to complete the utterance 304 at time $t_3$, Joe S. begins speaking utterance 306 at a time $t_2$ which includes the words "Adapting to the new procedures has been a frustrating process that affected my total sales." Consequently, the transcript generation module 130 determines that utterance 306 is an interruption with regard to utterance 304 because two voices of two different people are detected and recognized during a same period of time, the time between $t_2$ and $t_3$.

Rather than generate a single flow text in which words of utterance 306 are interspersed with words of utterance 304 in a strictly time-based manner, the transcript generation module 130 separately identifies the words that comprise utterance 304 and the words that comprise utterance 306 using voice recognition profiles, and groups them into separate text segments to be displayed in the transcript. More specifically, the transcript generation module 130 is configured to distinguish between a first set of words (e.g., "Our team did not meet the sales goal for this") that were spoken by Lisa R. before Joe S. interrupts her and/or begins speaking and a second set of words (e.g., "quarter, although we were close. I believe there are some valid reasons for this, and I understand that each of you may have some additional feedback as to why we fell short.") that are spoken by Lisa R. after Joe S. interrupts her and/or begins speaking at time $t_2$. The interruption may cause Lisa R. to pause for a short period of time (e.g., a few seconds) after the first set of words are spoken and before speaking the second set of words. Alternatively, Lisa R. may continue to speak even as Joe S. speaks. However, the transcript generation module 130 combines the first and second sets of words spoken by Lisa R. into a single utterance and a single text segment.

In various examples, the first and second sets of words being spoken within a predefined period of time 308 (e.g., the time between $t_1$ and $t_3$ is less than the predefined period of time 308) may be a condition that must be satisfied to combine the first and second sets of words into a single text segment given a situation where there is an interruption caused by another user speaking an utterance. For example, the predefined period of time 308 can be ten seconds, fifteen seconds, twenty seconds, thirty seconds, one minute, and so forth. The predefined period of time 308 can help ensure that the context of the conversation is not lost when multiple users are conversing with one another. That is, the predefined period of time 308 can help prevent a large number of words spoken by one user from being combined into a single text segment when other users are also speaking. Of course, a text segment can include a large number of words provided one user continues to speak without being interrupted by anyone else in the meeting (e.g., other users do not interject and do not say anything while the first user is speaking).

In various examples, a minimum threshold number of words can be a condition used when creating text segments, so words spoken by a single user in a short period of time (e.g., five seconds, ten seconds, etc.) are grouped together in a single text segment rather than being chopped up into multiple different text segments, given a situation where there is an interruption caused by another user speaking an utterance. As shown in FIG. 3, the transcript generation module 130 can determine that a number of words in the first set of words (e.g., "Our team did not meet the sales goal for this") does not meet or exceed the minimum threshold number of words 310 established for a text segment. Thus, the transcript generation module 130 can combine the first and second sets of words into a single utterance and a single text segment, as previously described. The minimum threshold number of words 310 can be used to help ensure that a single text segment does not include too few words given that a user is interrupted by another user and the user continues to say more words after the interruption but within the predefined period of time 308. Stated another way, the minimum threshold number of words can be used to help prevent a series of choppy text segments that are difficult for a reader to understand and that make it difficult for a reader to follow the conversation. An example minimum threshold number of words can include four, five, six, seven, eight, nine, ten, eleven, and so forth. The minimum threshold number of words used with respect to utterance 304 in FIG. 3 is eleven or more since there are ten words in the illustrated box.

Note that the minimum threshold number of words condition applies in situations where the user continues to speak. Consequently, if a user says a small number of words without continuing to speak within the predefined period of time 308 (e.g., the user says "yes" or "no" in response to a question or the user says, "I agree" and stops speaking), then the user's word(s) can amount to an utterance and a corresponding text segment using the techniques described herein.

As further shown in FIG. 3, at a later time $t_4$ during the meeting, Lisa R. begins speaking utterance 312 which includes the words: "I know we encountered some unexpected obstacles, but I still think we can identify some key points that will help us improve sales." Before Lisa R. is able to complete the utterance 312 at time $t_6$, Tim G. begins speaking utterance 314 at a time $t_5$ which includes the words: "We need to focus on upselling existing customers rather than put so much effort into attracting new customers." Consequently, the transcript generation module 130 determines that utterance 314 is an interruption with regard to utterance 312 because two voices of two different people are detected and recognized during a same period of time, the time between $t_5$ and $t_6$.

Again, the transcript generation module 130 is configured to distinguish between a first set of words (e.g., "I know we encountered some unexpected obstacles, but I still") that were spoken by Lisa R. before Tim G. interrupts her and a second set of words (e.g., "think we can identify some key points that will help us improve sales.") that are spoken by Lisa R. after Tim G. interrupts her at time $t_5$. Moreover, the transcript generation module 130 combines the first and second sets of words spoken by Lisa R. into a single utterance and a single text segment.

In various examples, a determination that a first set of words and a second set of words are part of a same linguistic unit can be used as a condition when creating text segments, so words spoken by a single user in a short period of time (e.g., five seconds, ten seconds, etc.) are grouped together in a single text segment rather than being chopped up into multiple different text segments, given a situation where there is an interruption caused by another user speaking an utterance. A linguistic unit can comprise a phrase, a clause, a sentence, a paragraph, or another type of linguistic unit that can be understood on its own from a grammar perspective. A type of linguistic unit (e.g., a sentence) can be predefined for a text segment.

As shown in FIG. 3, the transcript generation module 130 can determine that the first set of words in utterance 312 (e.g., "I know we encountered some unexpected obstacles, but I still") and the second set of words in utterance 312 (e.g., "think we can identify some key points that will help us improve sales.") are part of the same sentence 316. Thus, the transcript generation module 130 can combine the first and second sets of words into a single utterance and a single text segment, as previously described. The linguistic unit condition can be used to help ensure that a single text segment includes words that can be understood from a grammar perspective given that a user is interrupted by another user and the user continues to say more words after the interruption but within the predefined period of time 308. Stated another way, the linguistic unit condition can be used to help prevent a series of choppy text segments that make it difficult for a reader to follow the conversation.

Consequently, as described with respect to FIG. 3, the transcript generation module 130 can separate a first utterance spoken by a first user and a second utterance spoken by a second user into different text segments given a situation where at least part of the first utterance and at least part of the second utterance are spoken during a same or overlapping period of time. The examples described above with respect to FIG. 3 captures a single interruption. However, the approach and analysis described can be used for subsequent or multiple interruptions with regard to creating text segments. For instance, the utterance 304 and the utterance 306 may both be interrupted by another utterance—Beth T. stating: "Losing two team members in the middle of the quarter hurt us", as illustrated in FIG. 2.

Figure 4:
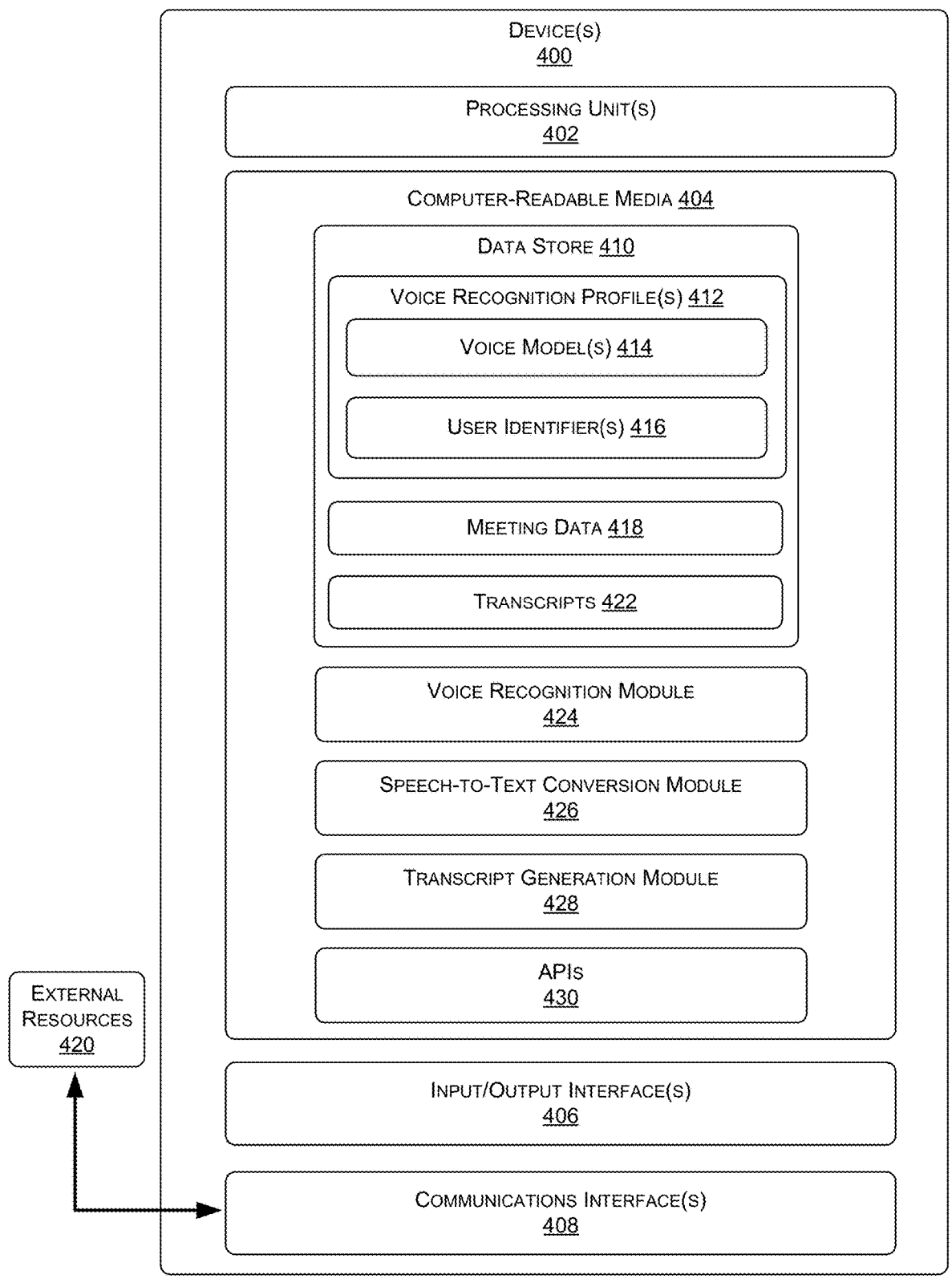
FIG. 4 is a diagram illustrating components of an example device configured to receive speech data, match a voice with a voice recognition profile, convert the speech data to text, and segment the text to generate a transcript that captures the context of a conversation.

FIG. 4 is a diagram illustrating components of an example device 400 configured to receive speech data, match a voice with a voice recognition profile, convert the speech data to text, and segment the text to generate a transcript that captures the context of a conversation. The example device 400 can be a speech capture device (e.g., speech capture device 116) or a device implemented in the network-based system 124 of FIG. 1. In some instances, the components illustrated in FIG. 4 can be spread across various ones of the devices described herein (e.g., the devices of FIG. 1).

In various examples, device 400 can include one or more computing devices that operate in a cluster or other grouped configuration to share resources, balance load, increase performance, provide fail-over support or redundancy, or for other purposes. Thus, device 400 can represent, but is not limited to, a server computer. Alternatively, device 400 can include, but is not limited to, a desktop computer, a gaming device, a tablet computer, a personal data assistant (PDA), a mobile phone/tablet hybrid, a laptop computer, a telecommunication device, a game console, a videoconferencing device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorder (PVR), a set-top box, a camera, an integrated component (e.g., a peripheral device) for inclusion in a computing device, an appliance, or any other sort of computing device.

Device 400 includes one or more processing unit(s) 402, computer-readable media 404, input/output (I/O) interfaces 406 that enable the use of I/O devices, and communication interface(s) 408. The components of device 400 can be operatively connected, for example, via a bus, which can include one or more of a system bus, a data bus, an address bus, a PCI bus, a Mini-PCI bus, and any variety of local, peripheral, and/or independent buses.

As used herein, processing unit(s) 402 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media 404 can store instructions executable by the processing unit(s) 402. Computer-readable media 404 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media 404 can include computer storage media and/or communication media. Computer storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The input/output (I/O) interfaces 406 enable communications with input/output devices such as user input devices including peripheral input devices (e.g., a game controller, a keyboard, a mouse, a pen, a voice input device such as a microphone, a touch input device, a gestural input device, a camera, and the like) and/or output devices including peripheral output devices (e.g., a display screen, a printer, audio speakers, a haptic output device, and the like).

Communication interface(s) 408 can represent, for example, network interface controllers (NICs) or other types of transceiver devices to send and receive communications over network(s), such as network(s) 114. Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like. In some examples, network(s) 114 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In the illustrated example, computer-readable media 404 can include a data store 410. In some examples, a data store includes data storage such as a database, data warehouse, or other type of structured or unstructured data storage. Data store 410 can store data for the operations of processes, applications, components, and/or modules stored in computer-readable media 404 and/or executed by processing unit(s) 402. For instance, in some examples, data store 410 can store voice recognition profiles 412 which can be accessed and/or retrieved for a scheduled meeting. A voice recognition profile 412 can include one or more voice model(s) 414 useable to recognize a voice of a user and one or more user identifier(s) 416 (e.g., a name, an alias, an avatar, a photo of the user, etc.). The data store 410 can further store meeting data 418. The meeting data 418 can be obtained from a calendar appointment object. For example, the meeting data 418 can include a list of expected or invited attendees. In some implementations, the list of expected or invited attendees can be used to access a corresponding set of voice recognition profiles 412 in advance of the meeting, or at the outset of the meeting, so that a transcript for the meeting can be generated. In some instances, the voice recognition profiles 412 can be retrieved from an external resource 420 (e.g., a social or enterprise network, a dictation service, etc.). Even further, data store 410 can store transcripts 422 after they are generated so that they can be provided and displayed.

The computer-readable media 404 can also include a voice recognition module 424 (e.g., voice recognition module 126), a speech-to-text conversion module 426 (e.g., speech-to-text conversion module 128), and a transcript generation module 428 (e.g., transcript generation module 130). As described above, the voice recognition module 424 is configured to match a voice with a voice recognition profile to determine an identifier for a user that spoke an utterance. The speech-to-text conversion module 426 is configured to convert speech to text. And the transcript generation module 428 is configured to separate the text into a sequence of text segments to be graphically displayed in association with a user identifier, examples of which are described above with respect to FIGS. 2 and 3.

The number of illustrated modules is just an example, and the number can vary higher or lower. That is, functionality described herein in association with the illustrated modules can be performed by a fewer number of modules or a larger number of modules on one device or spread across multiple devices.

In various examples, the computer-readable media 404 may also include application programming interface(s) (APIs) 430. The API(s) 430 are configured to expose the functionality of the modules to an external system (e.g., a collaboration application, a calendar application, etc.).

Figure 5A:
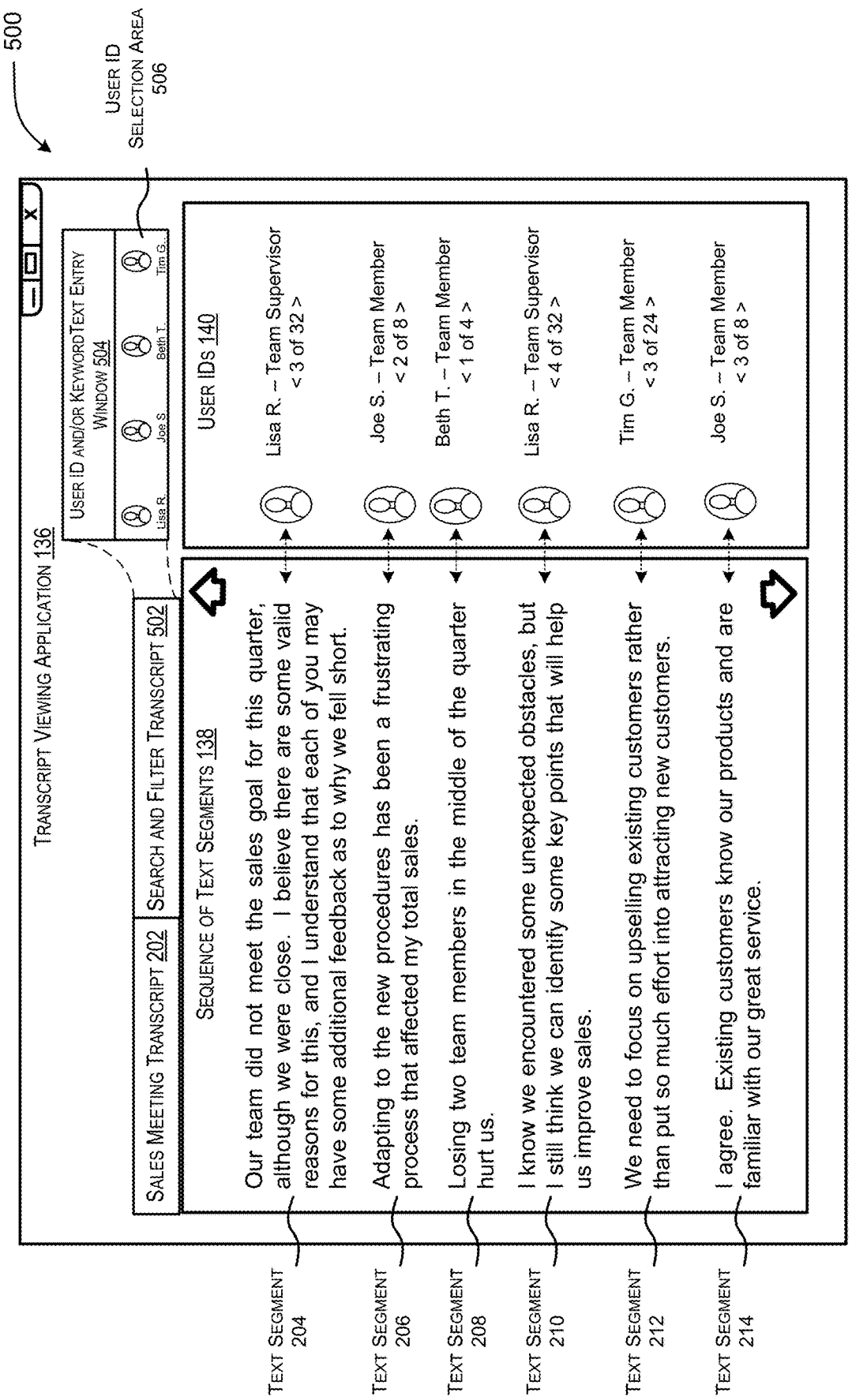
FIG. 5A illustrates an example graphical user interface that displays a selectable control element that enables the transcript to be filtered based on at least one of a user identifier or a keyword.
Figure 5B:
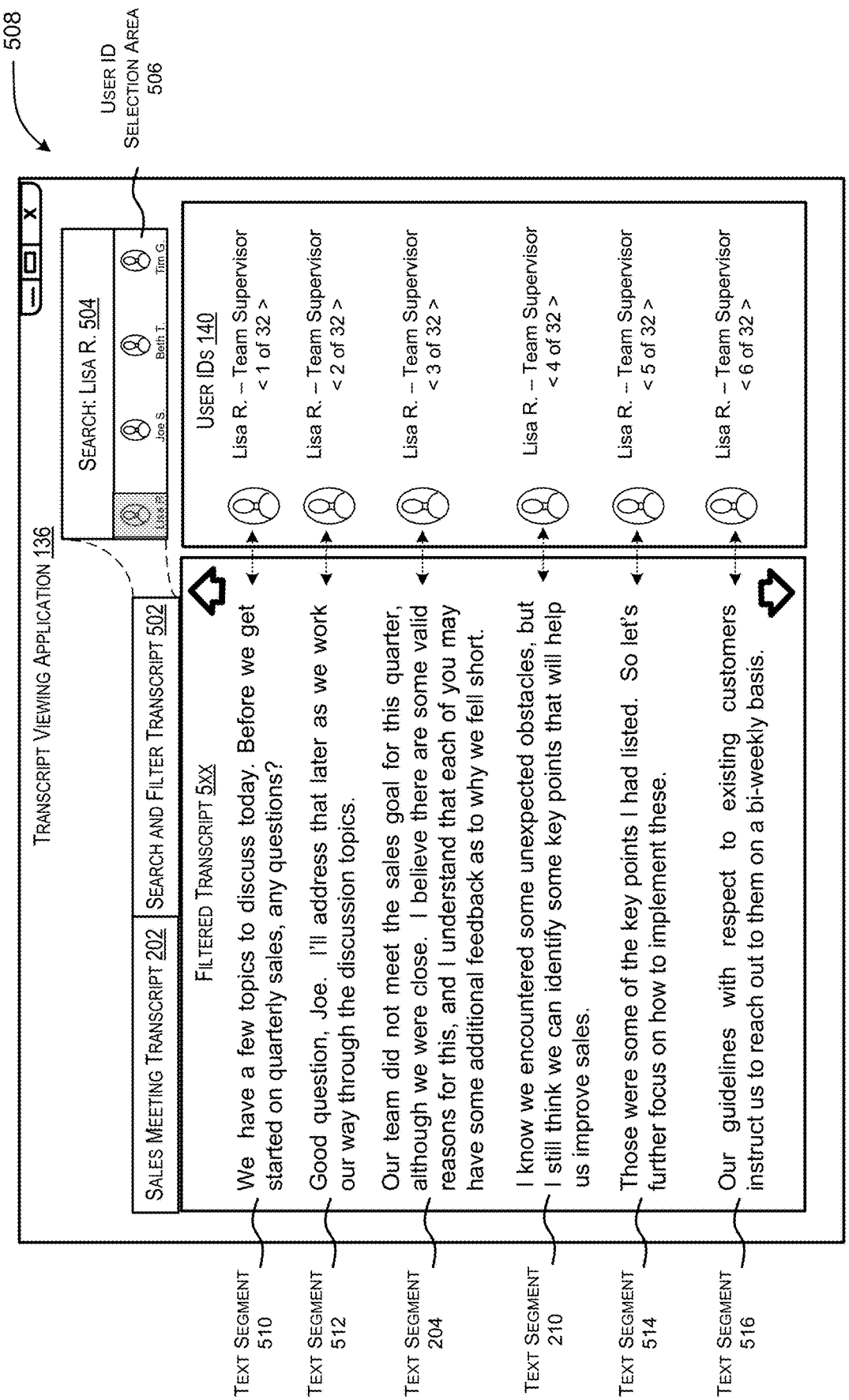
FIG. 5B illustrates an example graphical user interface that displays a filtered transcript in response to receiving user input that specifies at least one of a user identifier or a keyword.

FIG. 5A illustrates an example graphical user interface 500 that displays a selectable control element that enables the transcript to be searched and filtered based on at least one of a user identifier or a keyword. The example graphical user interface 500 reflects a similar layout as the graphical user interface 200 of FIG. 2. However, the example graphical user interface 500 contains a control element 502 that enables the transcript to be searched and filtered. Upon receiving user input that selects the control element 502, the user may be presented with filtering options. In one example, a text entry window 504 is displayed, which enables the user to type in keyword(s) or a user identifier. In another example, an area 506 that displays user identifiers (e.g., names, photos, etc.) can be displayed.

Upon receiving further user input that specifies a user identifier and/or keyword(s), the transcript generation module 428 is configured to search for and identify text segments in the sales meeting transcript 202 that include the user identifier and/or the keyword(s) specified by the user input. As shown in the example graphical user interface 508 of FIG. 5B, the sales meeting transcript 202 is filtered so that the identified text segments are displayed. In this example, a person reviewing the sales meeting transcript enters "Lisa R." into the text entry window 504 or selects the user identifier corresponding to Lisa R. in the user identifier selection area 506. In response, the text segments that capture utterances spoken by Lisa R. are configured for display and/or to be scrolled through. These text segments include text segments 204 and 210 from FIG. 2, but also text segments 510, 512, 514, and 516. Note that text segments 510, 512, 204, 210, 514, and 516 are displayed in an order in which the utterances are spoken by Lisa R.

Consequently, a filtering control element enables a user to quickly locate text segments spoken by a specific user if the user only wants to know what the specific user said during the meeting. Moreover, the filtering control element enables a user to quickly locate text segments that discuss a keyword if the user only wants to review the discussion about a particular topic.

In some implementations, a preset number (e.g., one, two, etc.) of one or more text segments that immediately precede an identified text segment and/or a preset number one or more text segments and one or more text segments that immediately follow the identified text segment may also be displayed in the filtered transcript, so a reader can effectively determine the context in which an utterance was spoken.

Figure 6:
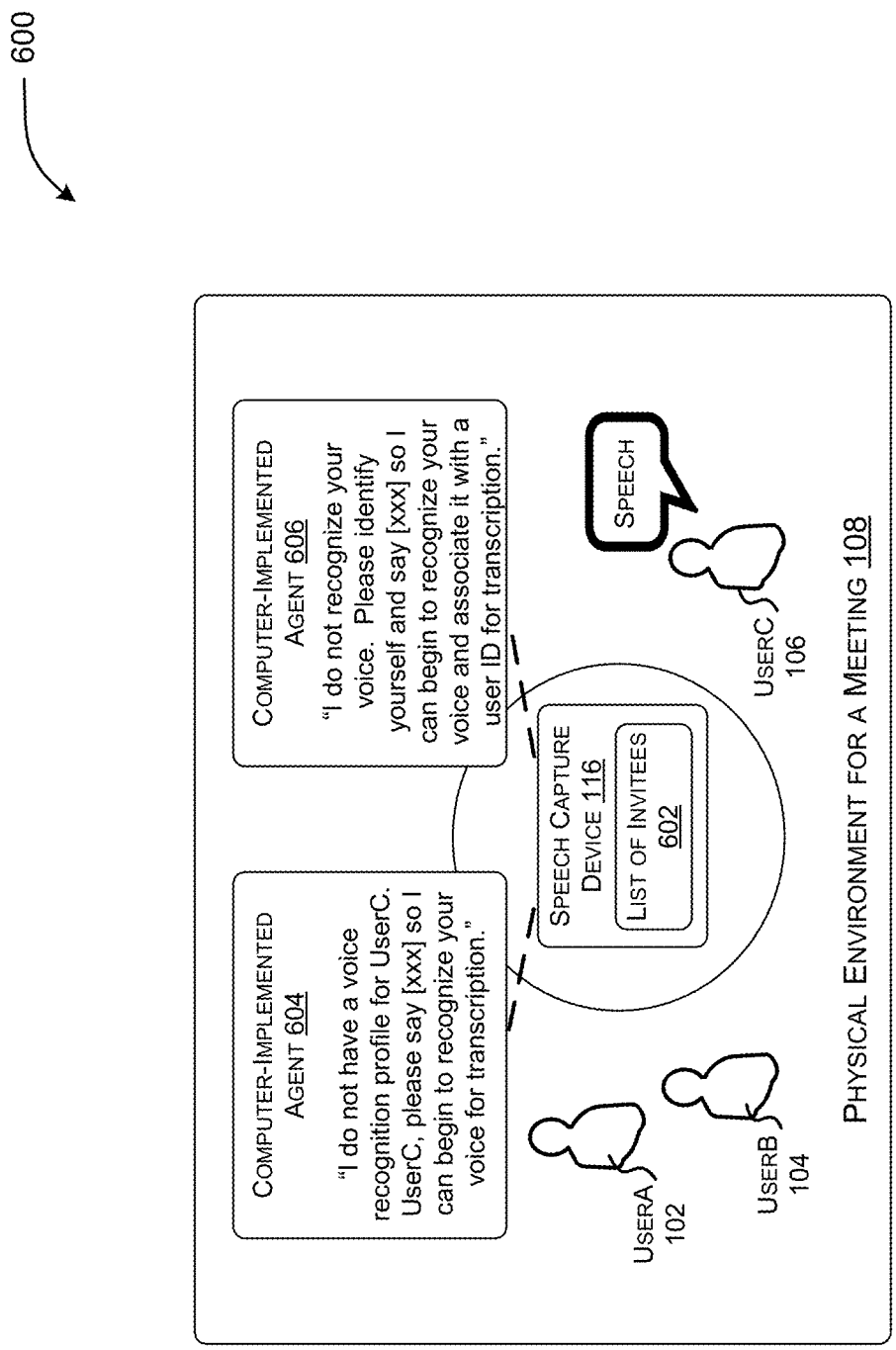
FIG. 6 illustrates an example environment in which a system can determine that a voice recognition profile is unavailable or inaccessible for a user that is attending the meeting or that is expected to attend the meeting.

FIG. 6 illustrates an example environment 600 in which a system determines that a voice recognition profile is unavailable or inaccessible for a user that is attending the meeting and subsequently takes action to obtain or build a voice recognition profile so that the voice of the user can be recognized. The environment 600 illustrates that the speech capture device 116 of FIG. 1, configured within the physical environment 108, has access to a list of invitees 602 to the meeting. The list of invitees 602 can be used to retrieve and prepare voice recognition profiles for UserA 102 and UserB 104, for example.

However, the speech capture device 116 may determine that a voice recognition profile cannot be accessed or retrieved for UserC 106, who is on the list of invitees 602. Accordingly, the speech capture device 116 can employ a computer-implemented agent 604 (e.g., a computer-implemented voice) to inform the attendees that a voice recognition profile cannot be accessed or retrieved for UserC and to ask UserC 106 to say some words, so a voice recognition profile can be built. As shown the computer-implemented agent 604 states: "I do not have a voice recognition profile for UserC. UserC, please say [xxx] so I can begin to recognize your voice for transcription" (where [xxx] may comprise a predefined statement useful to model a voice).

In another example, after the meeting has started, the speech capture device 116 and/or the voice recognition module 424 may detect an unrecognizable voice (e.g., there is no voice recognition profile that matches the voice). For instance, UserC 106 may begin speaking as shown. Accordingly, the speech capture device 116 can employ a computer-implemented agent 606 to inform the attendees that a voice cannot be recognized and to ask for (i) a user identity associated with the unrecognized voice and (ii) the unidentified user to say some words so a voice recognition profile can be built. As shown the computer-implemented agent 606 states: "I do not recognize your voice. Please identify yourself and say [xxx] so I can begin to recognize your voice and associate it with a user ID for transcription" (where [xxx] may comprise a predefined statement useful to model a voice). In response, UserC 106 can state his name and say some words to that his or her later utterances can be properly attributed in the transcript.

Figure 7:
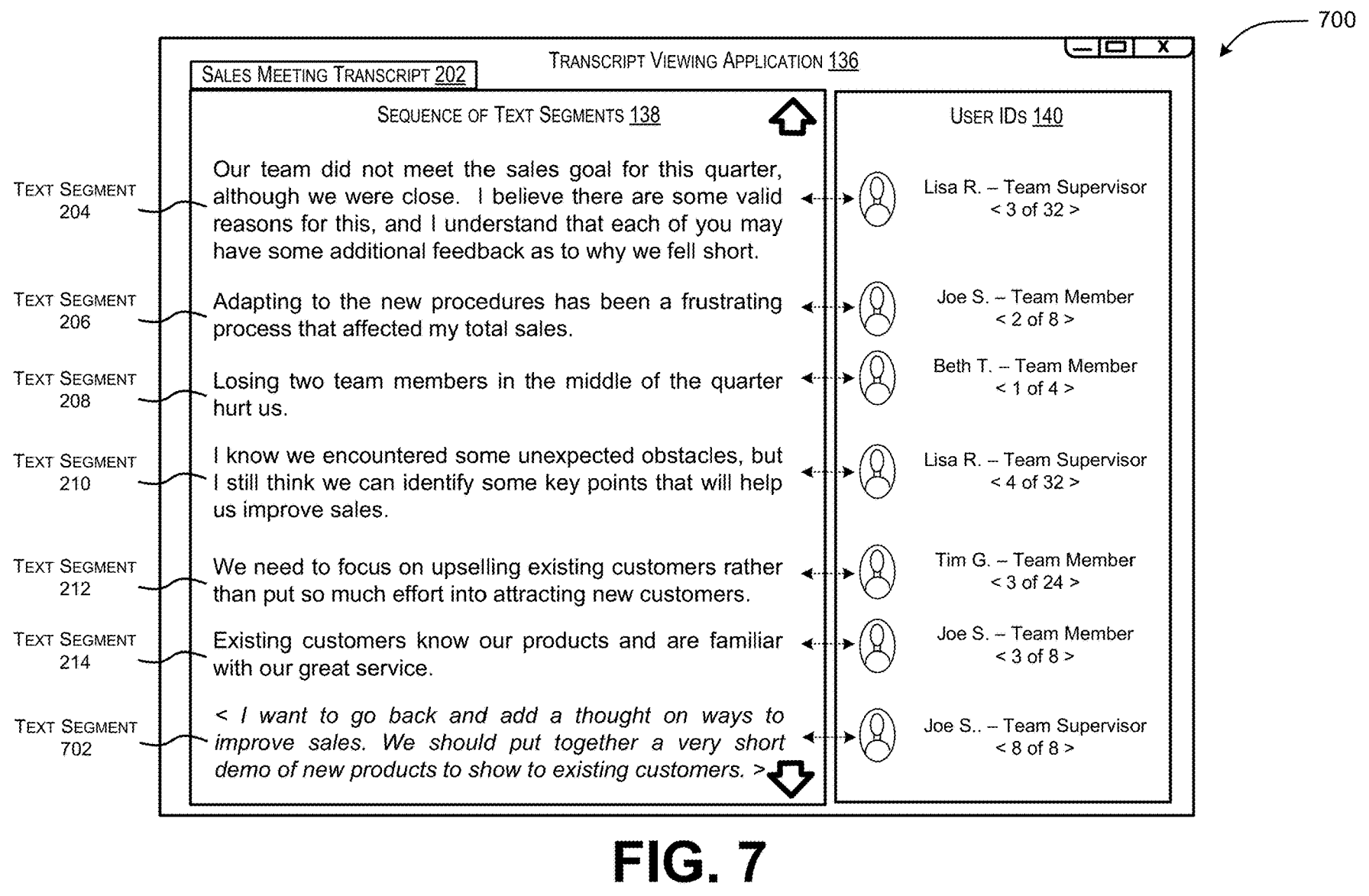

FIG. 7 illustrates an example graphical user interface 700 that displays a re-positioned text segment in the sequence of text segments based on an association between an utterance and a previously discussed topic during the meeting. The example graphical user interface 700 reflects a similar layout as the graphical user interface 200 of FIG. 2. However, the example graphical user interface 700 contains an additional text segment 702 that has been inserted into the sales meeting transcript 202 as a result of a user (e.g., Joe S.) referring to or describing a previously discussed topic (e.g., improving sales). Joe S. may have made a comment later in the meeting some time (e.g., five minutes, ten minutes, etc.) after the discussion switched from ways to improve sales to a next topic item on the meeting agenda. Note that the graphical user interface 700 indicates that this is the eighth of eight total utterances by Joe S.

The transcript generation module 428 can be configured to use keyword matching to determine that an utterance describes a previously discussed topic and the transcript generation module 428 can re-position a corresponding text segment in the sequence of text segments so that the utterance is placed with other text segments of the transcript that describe the previously discussed topic. This helps a reader view what was discussed in a more organized manner given a situation where there is an out of place utterance such as "I want to go back and add a thought on ways to improve sales. We should put together a very short demo of new products to show to existing customers." In some implementations, the transcript generation module 428 can look for trigger words that indicate a user is returning to a topic of a previous discussion or conversation (e.g., "going back", "returning to", "forgot to mention", "revisiting", "expanding on", etc.).

In various examples, a transcript can provide a visual distinction or a visual indication with respect to re-positioned text segments. As shown, text segment 702 is italicized. Alternatively, re-positioned text segments can be highlighted, underlined, bolded, or labeled as a repositioned text segment.

Figure 8:
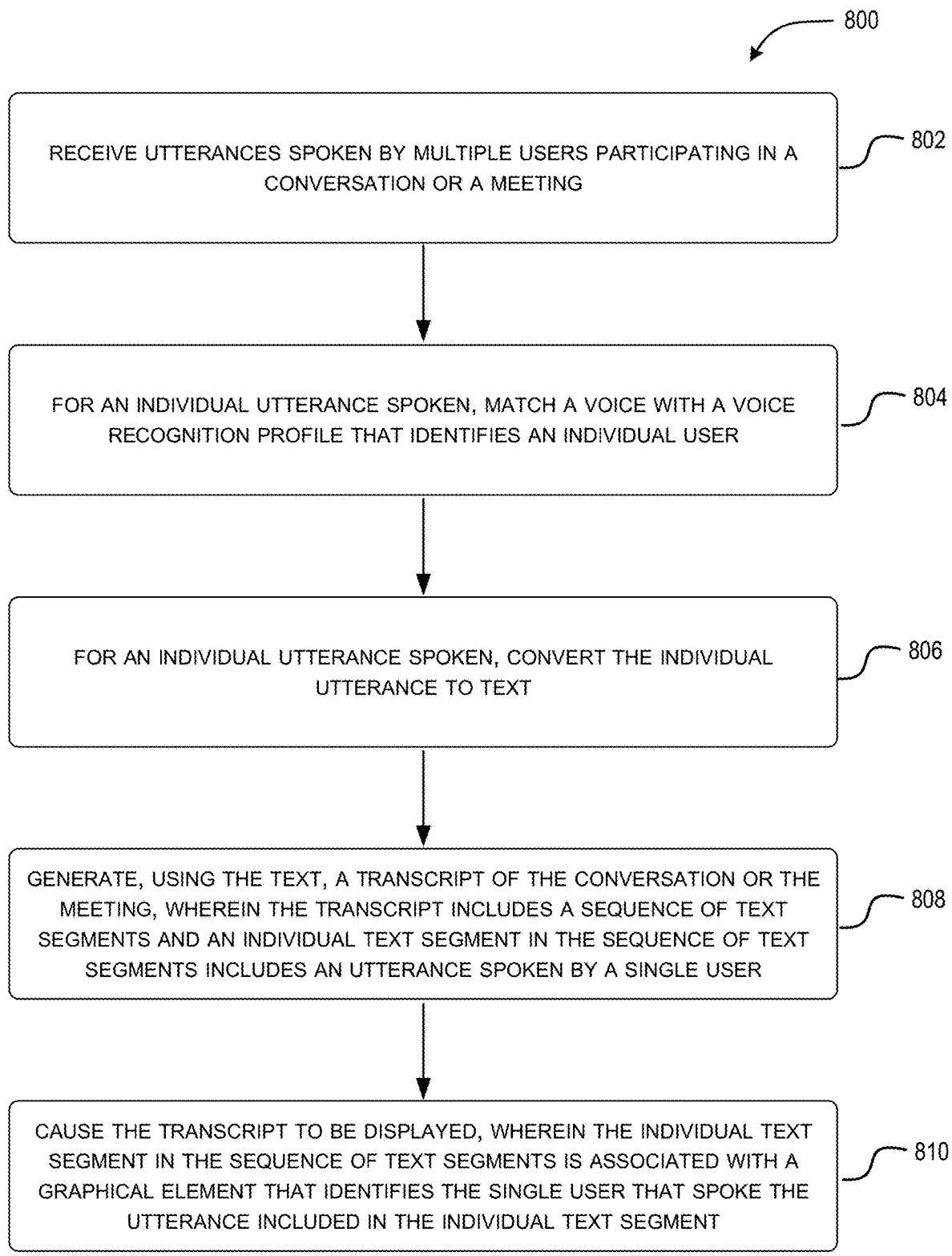
FIG. 8 is a flow diagram of an example method for generating a transcript based on speech from multiple users participating in a conversation or a meeting.
Figure 9:
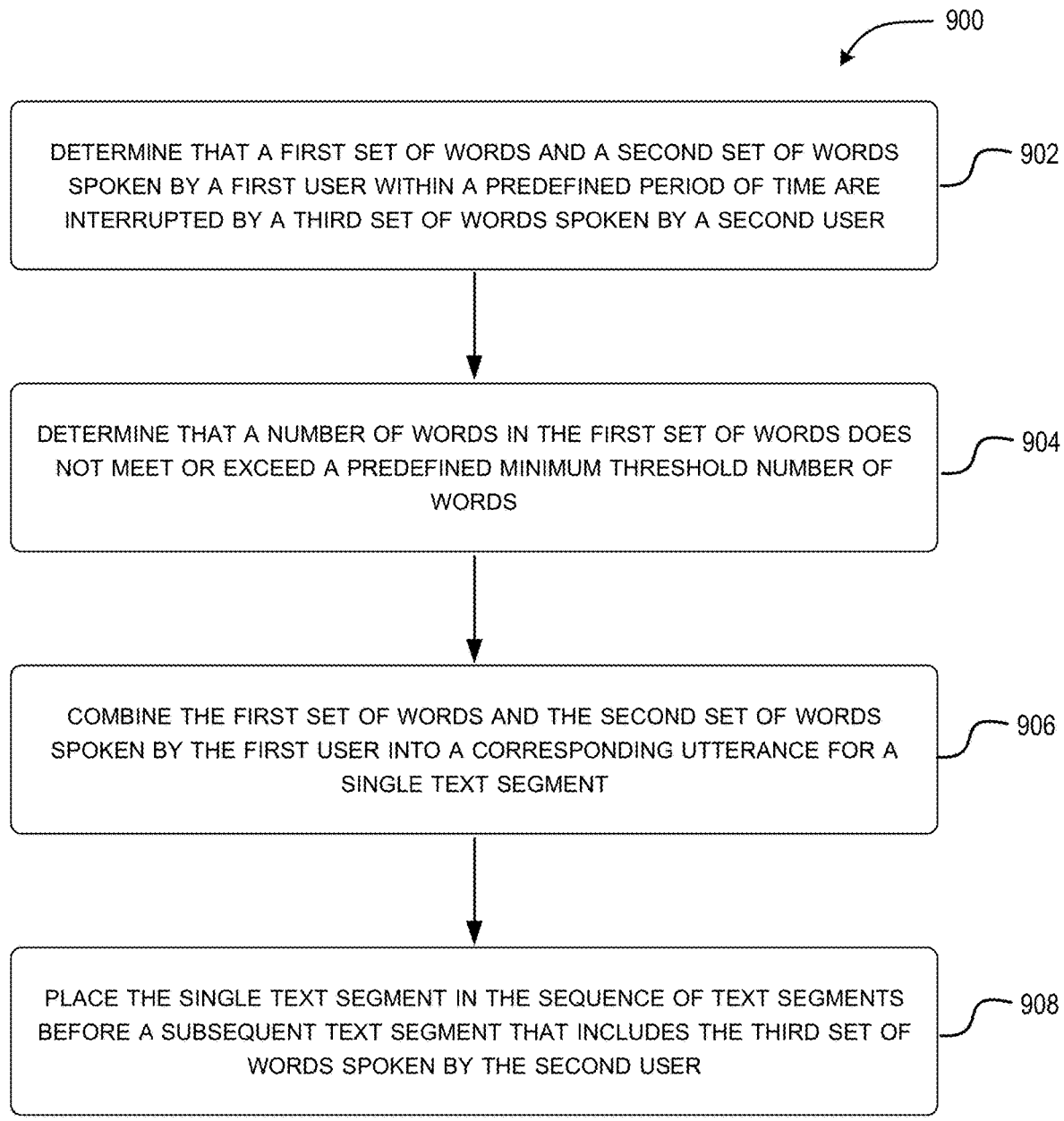
FIG. 9 is a flow diagram of an example method for creating a text segment based on an utterance spoken by one user provided the user is interrupted by another user during a conversation or a meeting.
Figure 10:
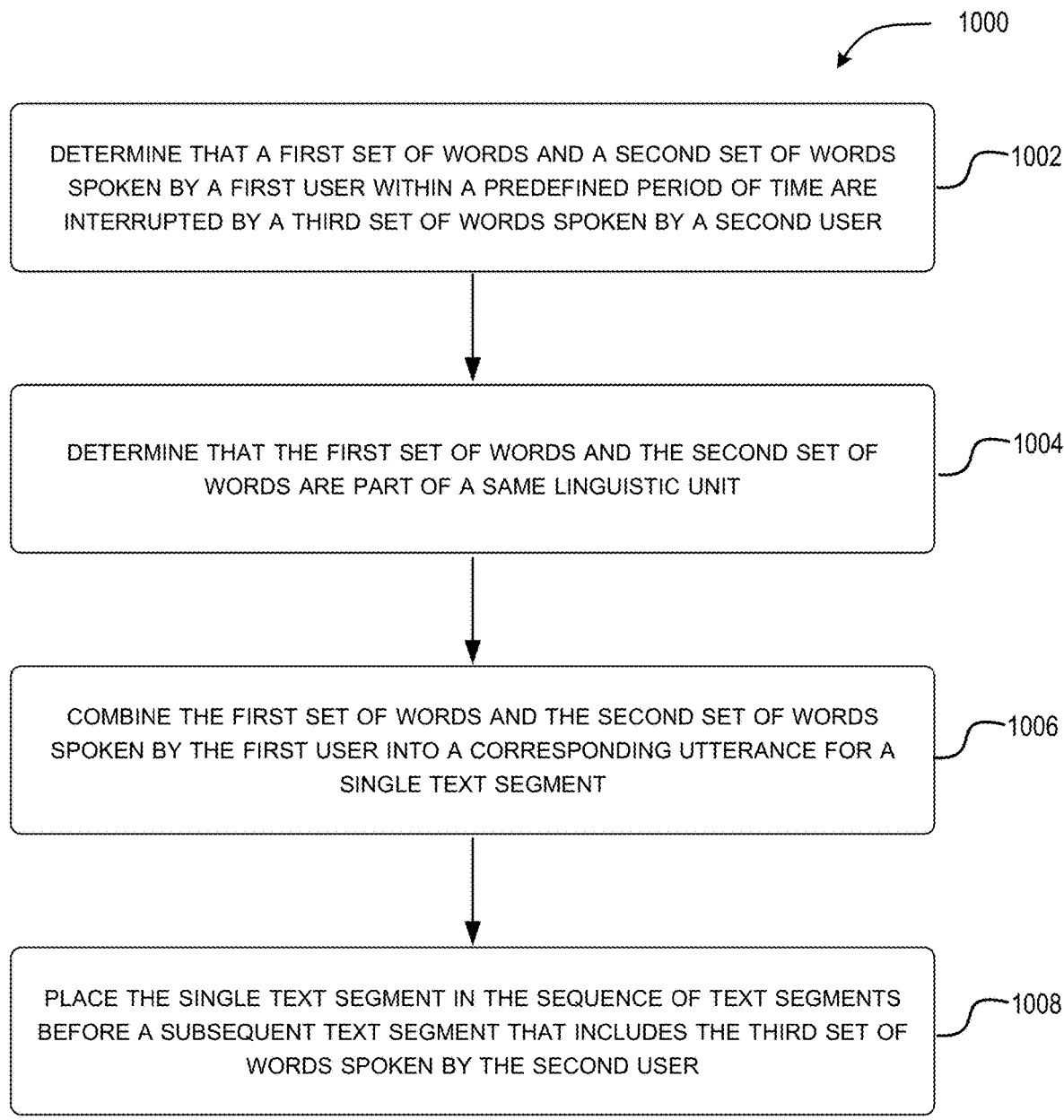
FIG. 10 is a flow diagram of another example method for creating a text segment based on an utterance spoken by one user provided the user is interrupted by another user during a conversation or a meeting.

FIGS. 8-10 represent example processes in accordance with various examples from the description of FIGS. 8-10. The example operations shown in FIGS. 8-10 can be implemented on or otherwise embodied in one or more of the various devices described herein. Components and/or modules of the devices described herein can carry out operation(s) of the example processes.

The order in which the operations are described in each example flow diagram is not intended to be construed as a limitation, and any number of the described operations can be combined in any order and/or in parallel to implement each process. Moreover, the operations in each of FIGS. 8-10 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 8 is a flow diagram 800 of an example method for generating a transcript based on speech from multiple users participating in a conversation or a meeting. In various examples, the operations of the example method are implemented by a speech capture device 116 and/or devices of the system 124, as illustrated in FIG. 1.

At operation 802, utterances spoken by multiple users participating in a conversation or a meeting are received. As described with respect to FIG. 1, the utterances can be captured by a speech capture device 116 and communicated over a network to a transcription service 122.

At operation 804, for an individual utterance spoken, a voice is matched with a voice recognition profile that identifies an individual user.

At operation 806, for an individual utterance spoken, the individual utterance is converted to text.

At operation 808, a transcript of the conversation or meeting is generated using the text. As described above, the transcript includes a sequence of text segments and an individual text segment in the sequence of text segments includes an utterance spoken by a single user of the multiple users.

At operation 810, the transcript of the conversation or meeting is caused to be displayed. An individual text segment in the sequence of text segments of the transcript is associated with a graphical element that identifies the single user that spoke the utterance included in the individual text segment.

FIG. 9 is a flow diagram 900 of an example method for creating a text segment based on an utterance spoken by one user provided the user is interrupted by another user during a conversation or a meeting. In various examples, the operations of the example method are implemented by a speech capture device 116 and/or devices of the system 124, as illustrated in FIG. 1.

At operation 902, it is determined that a first set of words and a second set of words spoken by a first user within a predefined period of time are interrupted by a third set of words spoken by a second user.

At operation 904, it is determined that a number of words in the first set of words does not meet or exceed a predefined minimum threshold number of words.

At operation 906, the first set of words and the second set of words spoken by the first user are combined into a corresponding utterance for a single text segment based on the determination that the number of words in the first set of words does not meet or exceed the predefined minimum threshold number of words.

At operation 908, the single text segment is placed in the sequence of text segments before a subsequent text segment that includes the third set of words spoken by the second user.

FIG. 10 is a flow diagram 1000 of another example method for creating a text segment based on an utterance spoken by one user provided the user is interrupted by another user during a conversation or a meeting. In various examples, the operations of the example method are implemented by a speech capture device 116 and/or devices of the system 124, as illustrated in FIG. 1.

At operation 1002, it is determined that a first set of words and a second set of words spoken by a first user within a predefined period of time are interrupted by a third set of words spoken by a second user.

At operation 1004, it is determined that the first set of words and the second set of words are part of a same linguistic unit for which text segments are based (e.g., a sentence).

At operation 1006, the first set of words and the second set of words spoken by the first user are combined into a corresponding utterance for a single text segment based on the determination that the first set of words and the second set of words are part of a same linguistic unit.

At operation 1008, the single text segment is placed in the sequence of text segments before a subsequent text segment that includes the third set of words spoken by the second user.

In various examples, short utterances can be displayed in a display area that is separate from a display area that displays the sequence of text segments of the transcript. A short utterance comprises an utterance that includes a small number of word(s) (e.g., a number less than a predefined threshold such as two, three, four, etc.) that stand on its/their own (e.g., "ok", "sure", "agreed", "right on", etc.) and that are not followed by further speech from the same user.

FIG. 11 illustrates an example graphical user interface 1100 that displays short utterances in a display area that is separate from a display area that displays the sequence of text segments of the transcript (e.g., the sales meeting transcript 202). The example graphical user interface 1100 includes content of the sales meeting transcript 202 which is included in the graphical user interface 200 of FIG. 2. However, the example graphical user interface 1100 displays short utterances in a separate display area (e.g., the sidebar 1102). Consequently, a viewer can still understand the entirety of what was said during the meeting and/or the conversation, but the short utterances do not disrupt the flow of conversation captured by the sequence of text segments 138. Furthermore, in this example, the user identifiers are displayed above the text segments 204, 206, 208, 210, 212, and 214.

A short utterance can be one that provides context to a conversation. For instance, the word "yes" on its own can have significance to the context of the conversation. Alternatively, a short utterance can be one that provides no or limited context to a conversation. For instance, a user may habitually state "sure", "ok", or "yeah" throughout the course of conversation and these words may be insignificant to the context of the conversation or may even be meaningless. In these type of scenarios, the short utterances can be displayed separately as shown in FIG. 11 where Jane W. says "Sure" in short utterance 1104, Tim. G says "Agreed" in short utterance 1106, and Beth T. says "Ok" in short utterance 1108.

In various implementations, the transcript generation module 428 is configured to identify an utterance that is insignificant to the context of the conversation so that the utterance is not included in the transcript and/or the sidebar 1102. The transcript generation module 428 can be configured to prevent an insignificant utterance from being included in the transcript and/or the sidebar 1102, remove the insignificant utterance from the transcript and/or the sidebar 1102, and/or configure the insignificant utterance in a display area that is distinguishable from a display area for the text segments of the transcript (as illustrated in FIG. 11).

The disclosure presented herein may be considered in view of the following example clauses.

Example Clause A, a system comprising: one or more processing units; and a computer-readable medium having encoded thereon computer-executable instructions to cause the one or more processing units to: receive utterances spoken by multiple users attending a meeting, at least a subset of the multiple users co-located in a physical environment in which the meeting is taking place; for an individual utterance spoken: match a voice with a voice recognition profile that identifies an individual user; and convert the individual utterance to text; generate, using the text of the individual utterance, a transcript for the meeting, wherein the transcript includes a sequence of text segments and an individual text segment in the sequence of text segments includes an utterance spoken by a single user of the multiple users; and cause the transcript for the meeting to be displayed, wherein the individual text segment in the sequence of text segments is associated with a graphical element that identifies the single user that spoke the utterance included in the individual text segment.

Example Clause B, the system of Example Clause A, wherein generating the transcript for the meeting comprises: combining a first set of words and a second set of words spoken by a first user into a corresponding utterance for a single text segment, wherein the first set of words and the second set of words spoken by the first user occur within a predefined period of time and the first set of words and the second set of words spoken by the first user are interrupted by a third set of words spoken by a second user; and placing the single text segment in the sequence of text segments before a subsequent text segment that includes the third set of words spoken by the second user.

Example Clause C, the system of Example Clause B, wherein the computer-executable instructions further cause the one or more processing units to determine that a number of words in the first set of words does not meet or exceed a predefined minimum threshold number of words, the combining of the first set of words and the second set of words spoken by the first user into the corresponding utterance for the single text segment occurring based on the determining that the number of words in the first set of words does not meet or exceed the predefined minimum threshold number of words.

Example Clause D, the system of Example Clause B, wherein the computer-executable instructions further cause the one or more processing units to determine that the first set of words and the second set of words are part of a same sentence, the combining of the first set of words and the second set of words spoken by the first user into the corresponding utterance for the single text segment occurring based on the determining that the first set of words and the second set of words are part of the same sentence.

Example Clause E, the system of Example Clause A, wherein generating the transcript comprises: separating a first utterance spoken by a first user and a second utterance spoken by a second user into different text segments, at least part of the first utterance and at least part of the second utterance being spoken during a same time period; and placing a first text segment that includes the first utterance in the sequence of text segments before a second text segment that includes the second utterance.

Example Clause F, the system of any one of Example Clauses A through E, wherein the computer-executable instructions further cause the one or more processing units to: cause a control element to be displayed, the control element enabling the transcript to be filtered based on at least one of a user identifier or a keyword; receive user input that specifies the at least one of the user identifier or the keyword; identify text segments in the transcript that include the at least one of the user identifier or the keyword specified by the user input; and filter the transcript to display the identified text segments.

Example Clause G, the system of any one of Example Clauses A through F, wherein the computer-executable instructions further cause the one or more processing units to: access a list of invitees to the meeting to determine an identity of the individual user; and use the identity of the individual user to access the voice recognition profile so that the voice recognition profile can be used during the meeting.

Example Clause H, the system of any one of Example Clauses A through G, wherein the computer-executable instructions further cause the one or more processing units to: prompt an unrecognizable user to provide an identity and speak; and build a voice recognition file for the unrecognizable user as the unrecognizable user speaks.

Example Clause I, the system of any one of Example Clauses A through G, wherein the computer-executable instructions further cause the one or more processing units to: access a list of invitees to the meeting to determine that a voice recognition profile cannot be accessed for an unrecognizable user identified on the list; prompt the unrecognizable user to speak; and build a voice recognition file for the unrecognizable user as the unrecognizable user speaks.

Example Clause J, the system of any one of Example Clauses A through I, wherein text segments in the transcript that are attributed to the individual user are numbered to reveal an ordering and a total number of the text segments.

Example Clause K, the system of any one of Example Clauses A through J, wherein the computer-executable instructions further cause the one or more processing units to identify a short utterance that is limited to one or two words, wherein generating the transcript comprises configuring the short utterance in a display area that is separated from a display area for the sequence of text segments.

While Example Clauses A through K are described above with respect to a system, it is understood in the context of this disclosure that the subject matter of Example Clauses A through K can also or alternatively be implemented by a device, via a method, and/or via computer-readable media.

Example Clause L, a method comprising: receiving utterances spoken by multiple users participating in a conversation; for an individual utterance spoken: matching a voice with a voice recognition profile that identifies an individual user; and converting the individual utterance to text; generating, using the text of the individual utterance, a transcript of the conversation, wherein the transcript includes a sequence of text segments and an individual text segment in the sequence of text segments includes an utterance spoken by a single user of the multiple users; and causing the transcript of the conversation to be displayed, wherein the individual text segment in the sequence of text segments is associated with a graphical element that identifies the single user that spoke the utterance included in the individual text segment.

Example Clause M, the method of Example Clause L, wherein generating the transcript for the meeting comprises: determining that a first set of words and a second set of words spoken by a first user within a predefined period of time are interrupted by a third set of words spoken by a second user; combining the first set of words and the second set of words spoken by the first user into a corresponding utterance for a single text segment; and placing the single text segment in the sequence of text segments before a subsequent text segment that includes the third set of words spoken by the second user.

Example Clause N, the method of Example Clause M, further comprising determining that a number of words in the first set of words does not meet or exceed a predefined minimum threshold number of words, the combining of the first set of words and the second set of words spoken by the first user into the corresponding utterance for the single text segment occurring based on the determining that the number of words in the first set of words does not meet or exceed the predefined minimum threshold number of words.

Example Clause O, the method of Example Clause M, further comprising determining that the first set of words and the second set of words are part of a same linguistic unit, the combining of the first set of words and the second set of words spoken by the first user into the corresponding utterance for the single text segment occurring based on the determining that the first set of words and the second set of words are part of the same linguistic unit.

Example Clause P, the method of any one of Example Clauses L through O, further comprising: causing a control element to be displayed, the control element enabling the transcript to be filtered based on at least one of a user identifier or a keyword; receiving user input that specifies the at least one of the user identifier or the keyword; identifying text segments in the transcript that include the at least one of the user identifier or the keyword specified by the user input; and filtering the transcript to display the identified text segments.

Example Clause Q, the method of any one of Example Clauses L through P, further comprising: accessing a list of invitees to a meeting to determine an identity of the individual user; and using the identity of the individual user to access the voice recognition profile so that the voice recognition profile can be used during the meeting.

Example Clause R, the method of any one of Example Clauses L through Q, further comprising: identifying a text segment that describes a previously discussed topic; and re-positioning the identified text segment in the sequence of text segments so that the identified text segment is placed with other text segments of the transcript that describe the previously discussed topic.

While Example Clauses L through R are described above with respect to a method, it is understood in the context of this disclosure that the subject matter of Example Clauses L through R can also or alternatively be implemented by a device, by a system, and/or via computer-readable media.

Example Clause S, a system comprising: one or more processing units; and a computer-readable medium having encoded thereon computer-executable instructions to cause the one or more processing units to: access a list of users invited to attend a meeting for which a request to generate a transcript has been received; for individual users on the list of users, retrieve a voice recognition profile; receive utterances spoken by multiple users attending the meeting; for an individual utterance spoken: match a voice with a voice recognition profile that identifies an individual user; and convert the individual utterance to text; generate, using the text of the individual utterance, a transcript for the meeting, wherein the transcript includes a sequence of text segments and an individual text segment in the sequence of text segments includes an utterance spoken by a single user of the multiple users; and cause the transcript for the meeting to be displayed, wherein the individual text segment in the sequence of text segments is associated with a graphical element that identifies the single user that spoke the utterance included in the individual text segment.

Example Clause T, the system of Example Clause S, wherein the list of users invited to attend the meeting is accessed via a calendar appointment object.

While Example Clauses S and T are described above with respect to a system, it is understood in the context of this disclosure that the subject matter of Example Clauses S and T can also or alternatively be implemented by a device, via a method, and/or via computer-readable media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processing units; and
a computer-readable medium having encoded thereon computer-executable instructions to cause the one or more processing units to:
receive utterances spoken by multiple users attending a meeting, at least a subset of the multiple users co-located in a physical environment in which the meeting is taking place;
for an individual utterance spoken:
match a voice with a voice recognition profile that identifies an individual user; and
convert the individual utterance to text;
generate, using the text of the individual utterance, a transcript for the meeting, wherein the transcript includes a sequence of text segments and an individual text segment in the sequence of text segments includes an utterance spoken by a single user of the multiple users, wherein generating the transcript for the meeting comprises:
combining a first set of words and a second set of words spoken by a first user into a corresponding utterance for a single text segment, wherein the first set of words and the second set of words spoken by the first user occur within a predefined period of time and the first set of words and the second set of words spoken by the first user are interrupted by a third set of words spoken by a second user; and
placing the single text segment in the sequence of text segments before a subsequent text segment that includes the third set of words spoken by the second user; and
cause the transcript for the meeting to be displayed, wherein the individual text segment in the sequence of text segments is associated with a graphical element that identifies the single user that spoke the utterance included in the individual text segment.

2. The system of claim 1, wherein the computer-executable instructions further cause the one or more processing units to determine that a number of words in the first set of words does not meet or exceed a predefined minimum threshold number of words, wherein the combining of the first set of words and the second set of words spoken by the first user into the corresponding utterance for the single text segment occurs based on the determining that the number of words in the first set of words does not meet or exceed the predefined minimum threshold number of words.

3. The system of claim 1, wherein the computer-executable instructions further cause the one or more processing units to determine that the first set of words and the second set of words are part of a same sentence, wherein the combining of the first set of words and the second set of words spoken by the first user into the corresponding utterance for the single text segment occurs based on the determining that the first set of words and the second set of words are part of the same sentence.

4. The system of claim 1, wherein the computer-executable instructions further cause the one or more processing units to:
cause a control element to be displayed, the control element enabling the transcript to be filtered based on at least one of a user identifier or a keyword;
receive user input that specifies the at least one of the user identifier or the keyword;
identify text segments in the transcript that include the at least one of the user identifier or the keyword specified by the user input; and
filter the transcript to display the identified text segments.

5. The system of claim 1, wherein the computer-executable instructions further cause the one or more processing units to:
access a list of invitees to the meeting to determine an identity of the individual user; and
use the identity of the individual user to access the voice recognition profile so that the voice recognition profile can be used during the meeting.

6. The system of claim 1, wherein the computer-executable instructions further cause the one or more processing units to:
prompt an unrecognizable user to provide an identity and speak; and
build a voice recognition file for the unrecognizable user as the unrecognizable user speaks.

7. The system of claim 1, wherein the computer-executable instructions further cause the one or more processing units to:
access a list of invitees to the meeting to determine that a voice recognition profile cannot be accessed for an unrecognizable user identified on the list;
prompt the unrecognizable user to speak; and
build a voice recognition file for the unrecognizable user as the unrecognizable user speaks.

8. The system of claim 1, wherein text segments in the transcript that are attributed to the individual user are numbered to reveal an ordering and a total number of the text segments.

9. The system of claim 1, wherein the computer-executable instructions further cause the one or more processing units to identify a short utterance that is limited to one or two words, wherein generating the transcript comprises configuring the short utterance in a display area that is separated from a display area for the sequence of text segments.

10. A method comprising:
receiving utterances spoken by multiple users participating in a conversation;
for an individual utterance spoken:
matching a voice with a voice recognition profile that identifies an individual user; and
converting the individual utterance to text;
generating, using the text of the individual utterance, a transcript of the conversation, wherein the transcript includes a sequence of text segments and an individual text segment in the sequence of text segments includes an utterance spoken by a single user of the multiple users, wherein generating the transcript for the meeting comprises:
determining that a first set of words and a second set of words spoken by a first user within a predefined period of time are interrupted by a third set of words spoken by a second user;
combining the first set of words and the second set of words spoken by the first user into a corresponding utterance for a single text segment; and placing the single text segment in the sequence of text segments before a subsequent text segment that includes the third set of words spoken by the second user; and causing the transcript of the conversation to be displayed, wherein the individual text segment in the sequence of text segments is associated with a graphical element that identifies the single user that spoke the utterance included in the individual text segment.

11. The method of claim 10, further comprising determining that a number of words in the first set of words does not meet or exceed a predefined minimum threshold number of words, wherein the combining of the first set of words and the second set of words spoken by the first user into the corresponding utterance for the single text segment occurs based on the determining that the number of words in the first set of words does not meet or exceed the predefined minimum threshold number of words.

12. The method of claim 10, further comprising determining that the first set of words and the second set of words are part of a same linguistic unit, wherein the combining of the first set of words and the second set of words spoken by the first user into the corresponding utterance for the single text segment occurs based on the determining that the first set of words and the second set of words are part of the same linguistic unit.

13. The method of claim 10, further comprising:
causing a control element to be displayed, the control element enabling the transcript to be filtered based on at least one of a user identifier or a keyword;
receiving user input that specifies the at least one of the user identifier or the keyword;
identifying text segments in the transcript that include the at least one of the user identifier or the keyword specified by the user input; and
filtering the transcript to display the identified text segments.

14. The method of claim 10, further comprising:
accessing a list of invitees to a meeting to determine an identity of the individual user; and
using the identity of the individual user to access the voice recognition profile so that the voice recognition profile can be used during the meeting.

15. The method of claim 10, further comprising:
identifying a text segment that describes a previously discussed topic; and re-positioning the identified text segment in the sequence of text segments so that the identified text segment is placed with other text segments of the transcript that describe the previously discussed topic.

16. A system comprising:
one or more processing units; and
a computer-readable medium having encoded thereon computer-executable instructions to cause the one or more processing units to:
access a list of users invited to attend a meeting for which a request to generate a transcript has been received;
for individual users on the list of users, retrieve a voice recognition profile;
receive utterances spoken by multiple users attending the meeting;
for an individual utterance spoken:
match a voice with a voice recognition profile that identifies an individual user; and
convert the individual utterance to text;
generate, using the text of the individual utterance, a transcript for the meeting, wherein the transcript includes a sequence of text segments and an individual text segment in the sequence of text segments includes an utterance spoken by a single user of the multiple users, wherein generating the transcript comprises:
combining a first set of words and a second set of words spoken by a first user into a corresponding utterance for a single text segment, wherein the first set of words and the second set of words spoken by the first user occur within a predefined period of time and the first set of words and the second set of words spoken by the first user are interrupted by a third set of words spoken by a second user; and
placing the single text segment in the sequence of text segments before a subsequent text segment that includes the third set of words spoken by the second user; and
cause the transcript for the meeting to be displayed, wherein the individual text segment in the sequence of text segments is associated with a graphical element that identifies the single user that spoke the utterance included in the individual text segment.

17. The system of claim 16, wherein the list of users invited to attend the meeting is accessed via a calendar appointment object.

* * * * *